(12) United States Patent
Gilbert

(10) Patent No.: US 7,465,492 B2
(45) Date of Patent: Dec. 16, 2008

(54) ELECTRICALLY DISBONDABLE COMPOSITIONS AND RELATED METHODS

(75) Inventor: Michael D. Gilbert, Brookline, NH (US)

(73) Assignee: EIC Laboratories, Inc., Norwood, MA (US)

(*) Notice: Subject to any disclaimer, the term of this patent is extended or adjusted under 35 U.S.C. 154(b) by 68 days.

(21) Appl. No.: 11/435,622

(22) Filed: May 17, 2006

(65) Prior Publication Data
US 2008/0283415 A1 Nov. 20, 2008

Related U.S. Application Data

(63) Continuation of application No. 09/352,976, filed on Jul. 14, 1999.

(51) Int. Cl.
- *B32B 7/12* (2006.01)
- *H01M 4/60* (2006.01)
- *H01M 4/68* (2006.01)
- *H01B 1/00* (2006.01)

(52) U.S. Cl. .................. 428/343; 428/355 R; 428/447; 429/212; 429/218.1; 252/500

(58) Field of Classification Search ............. 428/355 R, 428/447; 252/500; 429/212, 218.1
See application file for complete search history.

(56) References Cited

U.S. PATENT DOCUMENTS

| | | | |
|---|---|---|---|
| 3,679,534 A | 7/1972 | Weinberg | |
| 4,171,240 A | 10/1979 | Wong | 216/87 |
| 4,729,797 A | 3/1988 | Linde et al. | 134/38 |
| 4,882,399 A | 11/1989 | Tesoro et al. | 525/523 |
| 5,100,494 A | 3/1992 | Schmidt | 156/344 |
| 5,219,679 A | 6/1993 | Abraham et al. | 429/310 |
| 5,252,413 A | 10/1993 | Alamgir et al. | 429/192 |
| 5,441,830 A | 8/1995 | Moulton et al. | 429/212 |
| 5,512,613 A | 4/1996 | Afzali-Ardakani et al. | 523/443 |
| 5,560,934 A | 10/1996 | Afzali-Ardakani et al. | 424/497 |
| 5,565,284 A | 10/1996 | Koga | 429/217 |
| 5,760,337 A | 6/1998 | Iyer et al. | 174/52.2 |
| 6,620,308 B2 | 9/2003 | Gilbert | 205/702 |

FOREIGN PATENT DOCUMENTS

| | | |
|---|---|---|
| EP | 672 094 B1 | 9/1995 |
| EP | 848 445 A1 | 6/1998 |
| EP | 852 406 A2 | 7/1998 |
| EP | 862 236 A2 | 9/1998 |

(Continued)

OTHER PUBLICATIONS

Gilbert, Michael D., "Cleavable Thermosetting Epoxies: A Tool for Monitoring Cure Chemistry Perturbation at an Interface," Mat. Res. Soc. Symp. Proc. vol. 304, 1993, 49-52.

(Continued)

*Primary Examiner*—Victor S Chang
(74) *Attorney, Agent, or Firm*—Goodwin Procter LLP

(57) ABSTRACT

Compositions capable of rapidly curing to a strong substrate bond are removable from a surface to which the composition is bonded without damage to the underlying substrates. The compositions of the present invention may be used in both temporary and permanent bonding and coating applications.

51 Claims, 4 Drawing Sheets

FOREIGN PATENT DOCUMENTS

| | | |
|---|---|---|
| JP | 11-134275 | 11/2000 |
| JP | 2000-319599 | 11/2000 |

OTHER PUBLICATIONS

Newman, John S., Introduction, Electrochemical Systems, Second Edition, 1991, 1-2 and 16-18.

Yang, Shu et al., Reworkable Epoxies: Thermosets with Thermally Cleavable Groups for Controlled Network Breakdown, Chem. Mater. 1998, 10, 1475-1482.

Ogino, Kenji et al., "Synthesis and Characterization of Thermally Degradable Polymer Networks," Chem. Mater. 1998, 10, 3833-3838.

U.S. Appl. No. 09/352,976, Gilbert, filed Jul. 14, 1999.

ELECTRICALLY DISBONDABLE COMPOSITIONS AND RELATED METHODS

CROSS-REFERENCE TO RELATED APPLICATION

This application claims priority to and the benefit of, and incorporates herein by reference in its entirety, U.S. patent application Ser. No. 09/352,976, which was filed on Jul. 14, 1999.

GOVERNMENT RIGHTS

This invention was made with United States government support under Contract No. F08635-97-C-0036 awarded by the U.S. Department of the Air Force and Contract No. DE-FG02-05ER84227 awarded by the Department of Energy. The United States government has certain rights to this invention.

FIELD OF THE INVENTION

This invention relates to materials for use as coatings and adhesives that may be disbonded from a surface to which they are applied without harm to that surface. The invention further relates to methods of disbonding adhesives and coatings from substrate surfaces.

BACKGROUND OF THE INVENTION

Adhesive bonds and polymeric coatings are commonly used in the assembly and finishing of manufactured goods. They are used in place of mechanical fasteners, such as screws, bolts and rivets, to provide bonds with reduced machining costs and greater adaptability in the manufacturing process. Adhesive bonds distribute stresses evenly, reduce the possibility of fatigue, and seal the joints from corrosive species. Similarly, polymer-based coatings are commonly applied to the exterior surface of manufactured products. These coatings provide protective layers that seal the surface from corrosive reactants, as well as provide a painted surface that can be aesthetically pleasing.

Among the best adhesives and coatings in terms of strength and durability are those based on thermosetting polymers. Typically applied as a liquid mixture of low molecular weight monomers, these adhesives wet and penetrate pores on the substrate surface. On cure, insoluble and infusible crosslinked polymers are formed; these are mechanically interlocked and often covalently bound to the substrate to which they are applied. Common amine-cured epoxies are a typical example of adhesives and coatings that employ thermosetting mixtures.

Although adhesive bonds offer many advantages over mechanical fasteners, they are essentially permanent. There are no methods available for ready disassembly of adhesively bonded objects. The separation strategies that do exist typically involve time-consuming chemical procedures requiring high temperatures and aggressive chemicals. Examples of such techniques are described in U.S. Pat. No. 4,171,240 to Wong and U.S. Pat. No. 4,729,797 to Linde et al. These techniques, although generally effective, are quite harsh and can damage the objects being separated, making them unsuitable for many applications.

Similarly, conventional coating materials, such as polyurethanes, epoxies, phenolics, melamines, and the like, are essentially permanent. Such coatings are often removed with an aggressive chemical agent that is applied to the coating surface to degrade the coating material. Mechanical abrasion, such as sand blasting or wire brushing, is also employed. Although these techniques are effective in removing the polymer coating, they are time and labor intensive, as well as being quite harsh and likely to cause damage to the underlying surface.

To provide materials that are more easily removed from a substrate, the prior art describes adhesives formed from reactive monomers containing linkages susceptible to chemical degradation, e.g., curable resins containing thermally labile linkages or thermally reversible crosslinks. Although these specially prepared materials are more readily cleaved from the substrate, they still require conditions that are harsh to delicate substrates or adjacent adhesive bonds.

Thus, there remains a need in the art for a material capable of being disbonded selectively and precisely under mild conditions, ideally from both bonded surfaces. Such a material would provide adhesive bonds and coatings that could be employed in a variety of applications where facile removal of the material from the surface is desired.

DESCRIPTION OF THE INVENTION

Brief Summary of the Invention

The present invention provides compositions capable of rapidly curing to strong substrate bonds that are removable from a surface to which the composition is bonded without damage to the underlying substrates, as well as related methods and structures. The compositions of the present invention may be used in both temporary and permanent bonding and coating applications.

In a first aspect, a composition in accordance with the invention is an electrochemically disbondable composition comprising a matrix functionality, an electrolyte, and a free radical initiator. The matrix functionality comprises a monomer selected from the group consisting of acrylics, methacrylics, and combinations thereof. The electrolyte provides sufficient ionic conductivity to the composition so as to facilitate a faradaic reaction at a bond formed between the composition and an electrically conductive surface. In response to an application of voltage across the surface, the composition disbonds from the surface.

In some embodiments, the monomer is selected from the group consisting of polar and non-polar monomers. Exemplary monomers include 2-methyl-2-nitropropyl methacrylate, tetrahydrofurfuryl acrylate, 2-ethylhexyl methacrylate, isobornyl methacrylate, bisphenol A glycerolate diacrylate, trimethylol propane triacrylate, tris[2-(acryloyloxy)ethyl] isocyanurate, poly(ethylene glycol) monoacrylate, poly(ethylene glycol) diacrylate, poly(ethylene glycol) methacrylate, poly(propylene glycol) monoacrylate, poly(propylene glycol) diacrylate, poly(propylene glycol) methacrylate, and bis [2-(methacryloyloxy)ethyl]phosphate.

In some embodiments, the electrolyte comprises a rubber toughener. Exemplary rubber tougheners include poly(butadiene-co-acrylonitrile, poly(epichlorohydrin), poly(epichlorohydrin-co-ethylene oxide, poly(epichlorohydrin-co-ethylene oxide-co-allyl glycidyl ether), and uncrosslinked rubbers containing ester, carbonate, amide, urethane, urea or vinylidene fluoride functionalities.

In some embodiments, the composition includes an additive, e.g., one or more of stability enhancers, cure enhancers, cure accelerants, ion coordinators, pigments, corrosion inhibitors, leveling agents, gloss promoters, plasticizers, and fillers. Suitable plasticizers include tetraethyleneglycol dimethyl ether (tetraglyme), low molecular weight oligomers of polyethylene glycol, and tributyl phosphate.

In some embodiments, the free radical initiator is selected from the group consisting of redox activated initiators, thermally activated initiators, ultraviolet activated initiators, and visible light activated initiators. The thermally activated initiator may be azobis(isobutyl nitrile). The redox activated initiator may comprise a peroxide and a reducing agent. A suitable peroxide is benzoyl peroxide. Suitable reducing agents include an amine or a transition metal salt. A suitable transition metal complex is ferrocene.

In some embodiments, the composition is a coating. In other embodiments, the composition is a sealant. In embodiments where the composition is employed as an adhesive, the resulting bond may have a shear strength of at least 200, and in some embodiments 1000 psi and/or a fixture time of less than about 30 minutes (and preferably less than about 20 minutes). The adhesive bond may cure at less than about 80° C., and may have an ionic conductivity in the range of $10^{-11}$ to $10^{-5}$ S/cm$^2$.

In another aspect, an electrochemically disbondable composition comprises a matrix functionality and an electrolyte. The matrix functionality comprises an epoxy and a monomer selected from the group consisting of acrylics, methacrylics, and combinations thereof. The electrolyte provides sufficient ionic conductivity to the composition so as to facilitate a faradaic reaction at a bond formed between the composition and an electrically conductive surface. In response to an application of voltage across the surface, the composition disbonds from the surface. In preferred embodiments, the epoxy may be selected from the group consisting of Bisphenol A type epoxies, novolac epoxies, aliphatic epoxies and tris epoxypropyl isocyanurate.

In some embodiments, the composition includes an additive, e.g., one or more of stability enhancers, curing agents, cure accelerants, ion coordinators, pigments, corrosion inhibitors, leveling agents, gloss promoters, plasticizers, and fillers. A suitable stability enhancer is SP-25 phenolic resin. A suitable cure accelerant is mercaptan or tetramethyl ethylenediamine. Suitable curing agents include linear aliphatic amines, cycloaliphatic amines or combinations thereof. For example, a linear aliphatic amine may be one or more of tetraethylene pentamine, triethylene tetramine, diethylene triamine, 4,7,10-trioxa-1,13-tridecanediamine, and jeffamines. A cycloaliphatic amine may be isophorone diamine. In some embodiments, the stoichiometric ratio of linear aliphatic amine or cycloaliphatic amine to epoxy is about 1:1.

In some embodiments, the electrolyte functionality includes a salt capable of being solvated into the composition. For example, the salt may be selected from the group consisting of lithium triflimide, lithium perchlorate, ammonium hexafluorophosphate, and sodium perchlorate.

The electrolyte may include an ion conductor, e.g., a block copolymer or a graft copolymer. The graft polymer may include a siloxane backbone and pendant blocks of high ionic conductivity, dimethicone polyols, dimethyl-methyl(polyethylene oxide) siloxanes, alkoxylated 3-hydroxypropyl-terminated dimethyl siloxanes, and/or dimethyl-methyl(3-hydroxypropyl) siloxanes. For example, the pendant blocks comprise polyether or polyglycol moieties. Suitable block copolymers comprise a linear block copolymer having matrix miscible and matrix immiscible blocks. For example, the matrix miscible blocks can be selected from the group consisting of aliphatic and aromatic polyethers, nitrile-functionalized polymers, acrylic and vinyl polymers and polyamides, while the matrix immiscible blocks may be selected from the group consisting of aliphatic and aromatic hydrocarbon polymers, acrylic and vinyl polymers, silicone polymers, phosphazine polymers, fluoropolymers, polysulfides, polyesters, polyamides and rigid-rod polymers. Suitable linear block copolymers include polyethylene-block-poly(ethylene glycol) and poly(ethylene glycol)-block-poly(propylene glycol)-block-poly(ethylene glycol).

In yet another aspect, the invention involves a method for disbonding a composition having a matrix functionality from an electrically conductive surface to which it is bonded. The electrically conductive surface is bonded by an adhesive having sufficient ionic conductivity to support a faradaic reaction, as described above. The matrix functionality comprises a free radical initiator and a polymer selected from the group consisting of acrylics, methacrylics, and combinations thereof. In response to a voltage applied across the surface, the composition disbonds from the surface. The applied voltage may be less than about 50 volts.

In still another aspect, the invention involves a method for disbonding a composition having a matrix functionality from an electrically conductive surface to which it is bonded. The electrically conductive surface is bonded by an adhesive having sufficient ionic conductivity to support a faradaic reaction, as described above. The matrix functionality comprises an epoxy and a polymer selected from the group consisting of acrylics, methacrylics, and combinations thereof. In response to a voltage applied across the surface, the composition disbonds from the surface. The applied voltage may be less than about 50 volts.

In another aspect, an adhesive composition in accordance with the invention is disbondable at two interfaces. The composition comprises a polymer and an electrolyte and facilitates joinder of two surfaces. In response to a voltage applied across both surfaces so as to form an anodic interface and a cathodic interface, the composition disbonds from both the anodic and cathodic surfaces. In preferred embodiments, the polymer comprises at least one member of the group consisting of epoxies, acrylics, and combinations thereof. For example, the acrylic polymer may be tris[2-(acryloyloxy) ethyl]isocyanurate. The epoxy may be selected from the group consisting of Bisphenol A type epoxies, novolac epoxies and tris epoxypropyl isocyanurate. In some embodiments, the adhesive bond may have a shear strength of at least 200 psi. The applied voltage may be less than about 50 volts.

In another aspect, a bonded structure in accordance with the invention includes two electrically conductive surfaces and a bond therebetween composed of the electrically disbondable composition described above. The structure comprises a first and second material layer having electrically conductive surfaces. A composition is disposed between the two material layers which comprises a matrix functionality and an electrolyte. The matrix functionality forms an adhesive bond to the electrically conductive surface of the first and second material layer, and the electrolyte provides sufficient ionic conductivity to the composition so that the composition can support a faradic reaction at the electrically conductive surface of both the first and second material layer. The faradaic reaction substantially weakens the adhesive bond with both material layers. (Without being bound to any particular theory or mechanism, while it is understood that a faradaic reaction facilitates disbonding, it is not known whether the reaction causes disbanding directly or in support of other processes, such as the transport of ions to the interface, that exert a more direct effect.) In some embodiments, the adhesive bond may have a shear strength of at least 200 psi.

A number of applications for electrochemically disbondable compositions are contemplated including permanent bonding, temporary bonding and release devices. Permanent bonding applications include assembly of appliances and structures, where disassembly may be required or desired to facilitate repositioning during fabrication or construction; repair and refurbishing operations during the lifetime of the appliance or structure; and recycling of parts and materials at the end of the service life of the appliance or structure. The electrochemically disbondable compositions greatly assists design for the environment (DfE) concepts and can be considered a "green" technology. The electrochemically disbondable compositions can be used in any application where adhesives are currently used and can be used in joining operations where the use of adhesives has been precluded due to the need for later disassembly.

Temporary bonding operations that benefit from the use of electrochemically disbondable compositions include the addition of temporary staging or supports to structures under construction, including the addition of supports to buildings undergoing refurbishment or restoration. Electrochemically disbondable compositions can also be used to hold objects for machining and other operations where strong support is required. An example includes the hold-down of silicon and other types of semiconductor wafers in the electronics industry. Temporary bonding applications include the attachment of sensors and other temporary devices to vehicles, watercraft, missiles or rockets during testing or operation. These sensors may measure strain, temperature, or acceleration, for example. Temporary structures used for storage, or in mobile operations (military, disasters, medical emergencies, or exploration) can be assembled using electrochemically disbondable compositions, allowing the rapid disassembly and re-use of the structures at other locations as needed. The structures envisioned include shelters, temporary bridges, radio communications towers, and the like. Electrochemically disbondable compositions permit variable assembly of the structures and easy modification thereof while in use, as well as preserving the strength and integrity of materials used to construct these structures.

Temporary bonding can be used to secure vehicles, machinery, appliances and furnishings during shipping. Many of these items have movable and, hence, breakable elements that can be preserved during shipping by temporary adhesive bonding. Accordingly, electrochemically disbondable compositions can be used to secure single or multiple objects that may be otherwise subject to damage during movement. Temporary adhesive bonding can facilitate the movement of large numbers of objects by securing them together. Temporary bonding of handles or straps can be used to facilitate movement of heavy or hard-to-hold objects.

Electrochemically disbondable compositions can be used in the temporary bonding of decorative items or façades to building exteriors or interiors and to vehicles and appliances. The temporary bonding of these decorative items facilitates rapid changeover as needed to refurbish the appearance of the vehicle, appliance or structure or to suit changing tastes. Exemplary uses include temporary bonding of signage, including advertising, price labels, nameplates, product identification plates, periodic maintenance tags, and the like. Release devices are typically fabricated by combining an electrically releasing bond with a spring, stressed metal, compressed rubber or some other material capable of the storage of mechanical energy through elastic deformation. The adhesive is formulated such that its bond strength prior to disbonding exceeds the combined stored load of the elastically deformed material and any additional loads placed on the bond. Following electrical disbanding, the residual bond strength of the adhesive bond should be less than the stored load of the elastically deformed material, resulting in release of the bond. Alternatively, a release device can be fabricated without a spring or other mechanical energy storage material, provided that the applied service loads are less than the bond strength prior to electrical disbonding and exceed the residual bond strength after disbanding.

Applications for release devices of the spring-loaded type include animal release collars, underwater (buoy) release devices, release devices for satellites and for rocket fairings. Release devices of this kind can be used in wells or in other hard to access areas to release equipment. These release devices can be used on balloons and long duration planes to jettison ballast or equipment for recovery. Release devices based on electrochemically disbondable compositions may be used to secure access doors on cargo containers or on appliances, preventing unauthorized access. Also included are access panels for maintenance of, for example, aircraft. The release device would secure the door or panel from the inside and would be hence inaccessible to mechanical defeat. Electrical release devices can be controlled using microelectronic packages such as incorporated into "smart tags". The transmission of a coded signal via wires or wireless communication (radio frequency or ultrasound) would be used to activate the release device. This application would benefit from the low cost of the device and from the high energy efficiency of the electrical disbond reaction.

BRIEF DESCRIPTION OF THE DRAWINGS

The foregoing discussion will be understood more readily from the following detailed description of the invention when taken in conjunction with the accompanying drawings, in which.

DESCRIPTION OF THE PREFERRED EMBODIMENTS

Figure 1:
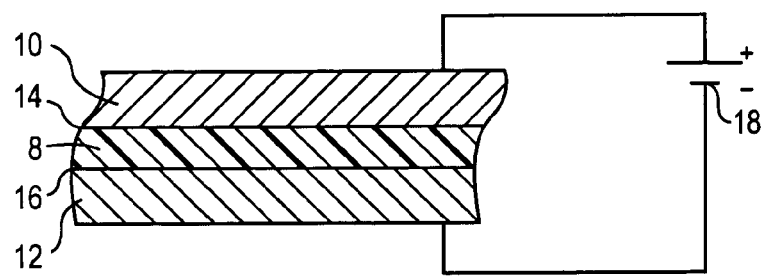
FIG. 1 is an enlarged sectional view of an embodiment of a bonded structure according to the invention that contains an anodic surface, a cathodic surface, and an adhesive composition.

The electrochemically disbondable composition of the invention possesses matrix functionality and electrolyte functionality. The electrolyte functionality provides sufficient ionic conductivity to support a faradaic reaction at an electrically conductive substrate in contact with the composition. The matrix functionality of the disbondable composition provides the adhesive or coating properties needed for its intended use.

The electrically conductive substrate may be a surface of the article being bonded or coated. Alternatively, the electrically conductive substrate may be one added to the coating or article to provide an electrochemically cleavable surface.

The adhesive property of the composition is disrupted by the application of an electrical potential across the bondline between the composition and at least one surface to which it is bonded. While not being bound to any particular mode of operation, the faradaic reaction which takes place at the composition/substrate interface weakens the bond therebetween. While the faradaic reaction may cause disbonding directly, the weakening of the adhesive bond may be the result of an indirect process initiated by the faradaic reaction such as chemical degradation of the disbondable material or gas evolution at the substrate interface and/or material embrittlement, possibly by changes in crosslink density of the disbondable composition. Alternatively, for some embodiments, the faradaic reactions may simply prevent polarization of the electrode and thus permit the free flow of ions, which destabilizes the morphology of the polymer blend used to form the adhesive.

Matrix functionality may be provided by one of the general classes of polymers and polymer resins used in bonding or coating surfaces. The materials may be prepared from commercially available polymer resins, often without modification.

The polymer may be a free-radical-curing polymer, which provides high strength and solvent resistance to the bond or coating along with rapid room-temperature cure. The polymer is typically formed by in situ reaction or curing of lower-molecular-weight species, e.g., polar or non-polar monomers. Exemplary free-radical-curing polymers include acrylics, methacrylics, and combinations thereof. Preferred free-radical-curing polymers include 2-methyl-2-nitropropyl methacrylate, tetrahydrofurfuryl acrylate, 2-ethylhexyl methacrylate, isobornyl methacrylate, bisphenol A glycerolate diacrylate, trimethylol propane triacrylate, tris[2-(acryloyloxy)ethyl]isocyanurate, poly(ethylene glycol) monoacrylate, poly(ethylene glycol) diacrylate, poly(ethylene glycol) methacrylate, poly(propylene glycol) monoacrylate, poly(propylene glycol) diacrylate, poly(propylene glycol) methacrylate, and bis[2-(methacryloyloxy)ethyl] phosphate. A preferred polymer resin for use as an adhesive or a coating is 2-methyl-2-nitropropyl methacrylate.

Curing of these polymers can be initiated using standard free-radical initiators including thermally activated initiators, such as azobis(isobutyl nitrile) (AIBN), and initiators activated by exposure to ultraviolet (UV) or visible light. In some embodiments, free-radical polymerization of standard acrylic adhesives is accomplished using a redox-activated initiator system. Preferred redox-activated initiator systems include a reducing agent such as an amine or a transition-metal salt combined with a peroxide. Electron transfer from the reducing agent to the peroxide results in its decomposition into anionic and free-radical fragments. The free-radical then initiates polymerization of vinyl-containing monomers (such as an acrylate) yielding a high-molecular-weight polymer. Use of multifunctional acrylates results in the formation of crosslinked thermosetting polymers suitable for use as structural adhesives. An especially preferred combination for redox initiated cure of the electrically disbonding compositions is benzoyl peroxide and ferrocene. Other combinations, known to those familiar with the art, can be used.

In some embodiments, the electrically disbondable compositions are formulated as two-part systems having the reducing agent located in one part (Part A) and the peroxide located in the other part (Part B). In other embodiments, the compositions are formulated as single-part compositions containing the peroxide or other redox initiator. For these mixtures, the composition is applied to one of two substrates to be bonded. A solution of activator (e.g., reducing amine or transition-metal salt) is then applied to the other substrate to be bonded. When the substrates are mated together the activator reacts with the initiator, initiating polymerization of the acrylic adhesive. Either of these formulations is suitable for the electrically releasing acrylic compositions of the present invention.

The polymer may also be an amine-cured polymer. Exemplary amine-cured polymers include acrylics, epoxies, and combinations thereof. Exemplary epoxies include Bisphenol A type epoxies, novolac epoxies and tris epoxypropyl isocyanurate. An exemplary acrylic polymer is tris[2-(acryloyloxy)ethyl]isocyanurate. The acrylic/epoxy hybrid resins are formulated as a two-part system; typically, the acrylic- and epoxy-functionalized materials are contained in Part A, while Part B comprises the aliphatic amine curative.

In some embodiments, the polymer includes a curing agent comprising linear aliphatic or cycloaliphatic amines, or combinations thereof. Exemplary amines include tetraethylene pentamine, triethylene tetramine, diethylene triamine, 4,7,10-trioxa-1,13-tridecanediamine, jeffamines and isophorone diamine. In formulating these compositions, the balance of primary amines to acrylic functionality should be held close to stoichiometry.

In some embodiments, the composition further comprises a cure accelerant. Exemplary cure accelerants include mercaptan or tetramethyl ethylenediamine.

The above polymers are well suited to provide the matrix functionality of the composition; however, in order to support a faradaic reaction at an electrically conductive substrate, the disbonding composition also must possess sufficient ion conductivity to permit ion transport. Modification of the polymer to promote or support ionic conductivity or to promote ion solubility may therefore be employed.

In one embodiment of the invention, the polymer includes ion-coordinating moieties that are capable of solvating ions (and in particular, cations) of the electrolyte. Exemplary ion-coordinating moieties include alkoxy groups, such as methoxy or ethoxy, and oligoethers, such as polyethylene oxide and the like, disulfide moieties, thioalkyl groups, alkyl or alkenyl nitrile groups, and polyvinylidene fluoride groups. By way of example only, an epoxy resin may be cured using a diamine having a high alkoxy content to provide additional oxygen sites for cation coordination. Example 10 describes the use of the diamine, 4,7,10-trioxy-1,13-tridecanediamine.

Another manner in which the polymer supports or promotes the dissolution and diffusional movement of the ions found in the electrolyte is to have a glass transition temperature ($T_g$) that is below the disbonding temperature. This can be achieved by increasing the disbonding temperature, adding a plasticizer, or adding a rubber toughener. The term "plasticizer" means an electrochemically stable additive which tends to increase the free volume and thus decrease the $T_g$ of the composition. Exemplary plasticizers include tetraethyleneglycol dimethyl ether (tetraglyme), low-molecular-weight oligomers of polyethylene glycol, and tributyl phosphate. Many other plasticizers well-known to skilled artisans may also be employed advantageously to lower $T_g$. It can be additionally advantageous if the plasticizing molecules are capable of solvating ions, as are the above-mentioned exemplary plasticizers. By solvating ions, the plasticizer additive increases the concentration of salts that may be added to the composition to provide ionic conductivity (see below). The compositions can comprise a plasticizer in an amount from 2% up to about 20% by weight of the composition. Exemplary rubber tougheners include poly(acrylonitrile-co-butadiene), poly(epichlorohydrin), poly(epichlorohydrin-co-ethylene oxide, poly(epichlorohydrin-co-ethylene oxide-coallyl glycidyl ether), and uncrosslinked rubbers containing ester, carbonate, amide, urethane, urea or vinylidene fluoride functionalities.

Heterogeneous curing can also be used to effect a low $T_g$. A heterogeneously cured resin is one in which the crosslink density or degree of polymer condensation varies throughout the composition, resulting in regions of high and low glass-transition temperatures. This may be achieved by locally varying the amount of crosslinking or curing agent in the polymer.

In some embodiments of the invention, the electrochemically disbondable composition includes a separate electrolyte phase to provide the electrolyte functionality of the disbondable composition. An electrolyte may be used in combination with any of the above-mentioned polymers. The electrolyte may be an ionically solvating molecule, including a plasticizer, or an oligomer or polymer also capable of solvating ions. Typically, ion solvation is obtained with polar molecules or molecules that are easily polarized. The electrolyte may also constitute a portion or region of a polymer, which is added to the composition. For example, the disbondable composition may include a block or graft copolymer having regions of high ionic conductivity and regions having some other desirable property, such as compatibility with the polymer resin. The polymer resin-miscible domains promote dispersion of the block copolymer throughout the entire resin, with the non-polar, epoxy immiscible blocks associating into nano-sized domains, forming pseudo-micelles. Without the polymer resin-miscible domains, certain combinations of polymer and electrolyte may not be sufficiently compatible to form a cohesive composition and mechanical and/or adhesive strength would be compromised.

The electrolyte functionality of the disbondable composition provides ionic conductivity sufficient to maintain a faradaic reaction at an interface with an electrically conductive surface. Sufficient conductivity may be readily established by preparing a composition and applying a voltage across a bondline with an electrically conductive substrate. If current flow is observed, a faradaic reaction at the bondline may be assumed. Sufficient ionic conductivity also may be empirically observed by applying a voltage across the bondline and noting whether the bond is weakened. Compositions with ionic conductivities in the range of $10^{-11}$ to $10^{-5}$ S/cm$^2$ at room-temperature are considered within the scope of the invention. Materials having higher ionic conductivities generally require shorter disbonding times. Compositions with ionic conductivities in the range of $10^{-9}$ to $10^{-7}$ S/cm$^2$ at room-temperature are preferred.

The electrolyte is desirably ionically conductive and capable of supporting ion diffusion of a salt solvated therein. In some embodiments, complex ion salts are added to the composition to provide ionic conductivity. Suitable salts include ammonium, alkali metal, alkali earth or rare earth salts of perchlorate, tetrafluoroborate, hexafluorophosphate, triflate and triflimide anions. Preferred salts include lithium triflimide, lithium perchlorate, ammonium hexafluorophosphate, and sodium perchlorate. Particularly for applications involving dual interface disbonding, the preferred salt is sodium perchlorate.

In another embodiment, the electrolyte functionality is provided by an ionomer. The ionomer is a polymer or oligomer with ionized groups that provide ions capable of being solvated in the composition.

The electrolyte is included in the disbondable composition in an amount sufficient to provide the requisite ionic conductivity to support the faradaic reaction of the disbonding process. The actual amount of electrolyte used in a particular composition is dependent on the ionic conductivity of the polymer and the ability of the electrolyte to form a continuous conductive pathway within the composition. While a continuous pathway is not absolutely required, it promotes the efficiency of the process. Where ions are required to tunnel through regions of higher resistance, higher voltages and longer times are required for disbanding.

Those skilled in the art are aware that a wide range of compositions may be used to obtain a substantially continuously conductive electrolyte phase, depending upon the materials used and how the composition phase separates. In some instances, a seemingly high level of electrolyte, e.g., 50 vol %, may be added without overly compromising the adhesive or mechanical properties of the disbondable composition. The composition is presumed to maintain its strength due to the ionic strengthening typically observed in polymeric systems containing salts or ionomers. Ionic domains may form, acting as pseudo-crosslinks in the ionically conductive regions or as crosslinks between the conductive region and the matrix polymer.

In preferred embodiments, the disbondable composition is a phase-separated composition having regions enriched in electrolyte having high ionic conductivity and regions enriched in matrix polymer having high mechanical or bonding strength. A phase-separating composition may comprise an initially miscible mixture of polymer resin and electrolyte. The electrolyte may segregate from the growing resin network during cure. Phase separation may be encouraged by increasing the molecular weight of the polymer resin, oligomeric (or polymeric) electrolyte additive, or both.

In preferred embodiments, phase separation results in regions having high ionic conductivity forming a continuous pathway within the composition. Without a continuous pathway, ions are required to traverse the high-strength, low-conductivity regions of the material during electrochemical disbonding. Bicontinuous or interpenetrating networks advantageously provide a continuous ionically conductive pathway without compromise to the mechanical strength of the adhesive polymer resin. Phase-separated compositions having the desired microstructure may be obtained by varying the relative proportions of the various components of the disbondable composition.

A preferred electrolyte additive for formation of a phase-separated microstructure is a block copolymer having a backbone with a low affinity for the polymer resin and pendant polymer blocks of high ionic conductivity. The low-affinity backbone serves as a nucleation point for phase separation by generating small non-solubilized domains within the pre-cured resin, while the ionically conductive pendant polymer blocks interact with the matrix polymer resin. During cure, the ionically conductive polymer phase separates from the curing resin and collapses toward the low-solubility domains, resulting in a well dispersed and continuous network.

Classes of block copolymers that provide electrolyte functionality have been identified. A preferred block copolymer is a graft copolymer. A graft copolymer may be a comb polymer. The comb polymer is a graft copolymer in which blocks or pendant oligomeric chains of a dissimilar polymer are more or less regularly repeated along the polymer backbone. Preferred graft copolymers include dimethicone polyols. An exemplary dimethicone polyol includes a siloxane backbone grafted with amine-terminated poly(ethylene glycol) pendant blocks such as poly(dimethylsiloxane-co-methyl(3-hydroxypropyl)siloxane-graft-poly(ethylene glycol) 3-aminopropylether (CAS No. 133779-15-4). Other exemplary pendant blocks include polyether or polyglycol moieties.

Other exemplary dimethicone polyols include polyether-modified polysiloxanes, such as that available from Goldschmidt Chemical Company as TEGOPREN 5843, or dimethyl-methyl(polyethylene oxide) siloxanes such as that available from Dow Corning Corporation as 193 SURFACTANT. Another preferred dimethicone polyol is ethoxylated 3-hydroxypropyl-terminated dimethyl siloxane such as that available from Dow Corning Corporation as 29 ADDITIVE. Many dimethicone polyols of various molecular weights, polyol/dimethicone ratio (also referred to as the hydrophilic/lipophilic balance), pendant group number and chain length, and pendant group terminal functionality are known to skilled artisans and the particular embodiments described are not limiting of the invention. In another embodiment, linear block copolymers are preferred additives in producing electrically disbonding compositions. Preferred linear block copolymers have matrix miscible and matrix immiscible blocks of different composition. By way of example, polyethylene-block-poly(ethylene glycol), a linear block copolymer having 50% by weight polyethylene glycol, (CAS 97953-22-5) is combined with resins providing matrix functionality to provide a disbondable composition. Other exemplary linear block copolymers include poly(ethylene glycol)-block-poly(propylenene glycol)-block-poly(ethylene glycol).

For disbonding compositions in which epoxies provide matrix functionality, immiscible blocks include a wide variety of aliphatic or aromatic hydrocarbon polymers, many acrylic and vinyl polymers, silicone polymers, phosphazine polymers fluoropolymers, polysulfides, polyesters, polyamides, and rigid-rod polymers. Epoxy-miscible blocks include many aliphatic and aromatic polyethers, nitrile functionalized polymers, certain acrylic and vinyl polymers, and polyamides. Skilled artisans will recognize that many linear block copolymers having matrix miscible and immiscible regions are conceivable and the examples given are not limiting of the invention.

It is understood that additives may be included in a disbonding composition so long as they do not compromise the bonding strength or ionic conductivity of the composition. Exemplary additives include pigments for color, corrosion inhibitors, leveling agents, gloss promoters, stability enhancers and fillers. The disbondable composition further may include particles of a non-conducting material, e.g., crushed glass or plastic beads, to prevent conductive surfaces useful in the disbonding process from contacting each other and forming a short circuit. Other additives will be apparent to those skilled in the art and are within the scope of the invention. An exemplary stability enhancer is SP-25 phenolic resin.

The solubilizing ability of the uncured composition and the post-cured composition may differ. Thus, initially soluble additives may be excluded from the composition as it cures. In some embodiments, additives may be selected for incorporation into the disbondable composition to retain their solubility in the cured polymer. In other embodiments, differing pre- and post-cured solubilities may be used to advantage in obtaining phase-separated materials (see below).

The disbondable compositions may be used as adhesives. A bonded joint may be obtained by disposing a disbondable composition between two or more surfaces such that the composition forms an adhesive bond to each surface and holds each surface in a generally fixed position relative to the other surface or surfaces while maintaining those positions in response to a force equal to at least the weight of the lightest bonded element.

A bonded joint may be obtained by applying an adhesive of the invention to a suitable surface as a solution, a melt or a reactive mixture. Solvents, if used, may be removed by evaporation prior to mating the substrates or may be absorbed by the coated substrate. Compositions applied as a melt, a solution or a reactive mixture wet the substrates and then solidify in order to achieve a high level of adhesion. When applied as a reactive mixture, the composition undergoes a curing reaction that converts the fluid-like mixture to a solid. The latter method of application is typically used for common two-component adhesives, such as conventional epoxies. The disbondable material of the invention may also be used as a sealant to fill and seal a joint or opening.

The disbondable material of the invention may also be applied as a coating to a substrate surface. It is advantageously employed as an undercoating or primer layer. As in the formation of a bonded joint, the disbondable material may be applied to a suitable surface as a solution, a melt or a reactive mixture. It is within the scope of the skilled artisan to prepare formulations suitable for coating applications.

In general, the electrically releasing compositions disclosed herein can be cured rapidly at temperatures less than about 80° C. in 30 minutes or less. In some embodiments comprising epoxies and acrylics, the cure mechanism comprises a two-stage reaction. In the first stage, the amine addition to acrylic occurs in less than about 20 minutes at about 20 to 23° C. to form a mixture of liquid and rigid network polymer. Within 6-20 minutes, depending on the composition, the mixture attains fixturing strength (>10 psi in shear), allowing the bonded substrates to be handled without fixtures or clamps for most operations. More slowly, epoxy amine addition increases the strength of this material until ultimate strength is achieved at 6-12 hours, again depending on the composition. This two-stage cure is valuable for use in multi-step or complex assembly operations. The second stage of the reaction can be carried out at elevated temperatures (80° C.) if desired to increase speed of cure. As shown in Table 1, failure to allow adequate curing at 20 to 23° C. prior to oven curing can have a dramatic effect on the ultimate bond strength. This is likely a manifestation of the 2-stage cure process.

TABLE 1

Effect of Cure Schedule on Tensile Bond Strength

| Cure Schedule | Tensile Bond Strength |
|---|---|
| Room-temperature for 12 hours | 2290 psi |
| 80° C. for 30 minutes | 1950 psi |
| R.T. for 30 minutes, 80° C. for 30 minutes | 3000 psi |

The strength of an adhesive bond may be determined in various ways. Typically, lap shear strengths are used as a measure of the strength of an adhesive bond. Shear strength is the force required to separate two overlapping plates when pulling in a direction parallel to the plane of the plates. Following ASTM procedure D-1002, an Instron tester or suitable alternative instrument is used for this purpose. Bonds formed using disbondable compositions are capable of high strength, having shear strengths of greater than 200 psi. Disbondable compositions employing epoxies for matrix functionality generally provide shear strengths in the range of 2000-4000 psi using this configuration. This is comparable to the shear strengths of conventional epoxy resins. Thus, it is possible to form an electrochemically disbondable joint without compromise to the mechanical strength of the bonded materials.

As described previously, ionic conductivity is a necessary feature of the disbondable composition. The rate of the disbonding faradaic reaction, and hence the time necessary to achieve the desired level of bond weakening, is determined by the ionic current flowing through the composition. This current can be measured in the external circuit using an ammeter. The magnitude of the current is small, typically less than 1 mA/cm$^2$ of bonded area when the disbonding voltage is initially applied. The current further decreases with time, often decaying to 0.2 mA/cm$^2$ or less after one minute. Although the relationship between current and disbonding voltage is not strictly linear, the use of higher disbonding voltages results in higher currents and more rapid disbondment. Likewise, the use of low disbonding voltages results in longer disbondment times. The practitioner may select a disbonding voltage from a few volts to greater than 100 volts, depending on the desired disbondment time and other considerations such as safety and the need to prevent damage to voltage-sensitive substrates.

The disbondment time at a particular disbonding voltage also depends on the ionic conductivity of the composition. Higher ionic conductivities permit higher currents at a given voltage and correspondingly support an increase in the rate of the disbonding reaction. However, the disbonding reaction occurs substantially at the interface between the composition and the substrate and the amount of faradaic charge (the time integral of the faradaic current) required to effect disbondment is very small. A typical value is less than 0.15 coulombs per square inch of bond area. Therefore, to achieve disbanding in a practical period of time requires only a small current and the level of ionic conductivity which is needed to support this activity is relatively low. This feature is advantageous because the formulation of materials with high ionic conductivity can lead to poor adhesive properties and limited mechanical strength.

The magnitude of ionic conductivity suitable for the disbanding process may be understood by measurement of the ionic conductivity of the disbondable composition described in Example 4. Ionic conductivity is determined using the AC impedance technique in which the complex impedance of the composition is measured over a wide frequency range (5-10 Hz) and the data is fit to a simple circuit model. This method has been previously described; see, MacDonald et al., J. Electroanal. Chem. 200:69-82 (1986). Values for ionic conductivity as a function of temperature are listed in Table 2.

TABLE 2

Conductivity Measurements

| Temperature (° C.) | Conductivity (S/cm) |
|---|---|
| −20 | $1.7 \times 10^{-10}$ |
| 0 | $6.9 \times 10^{-9}$ |
| 20 | $8.6 \times 10^{-8}$ |
| 40 | $6.3 \times 10^{-7}$ |
| 60 | $2.1 \times 10^{-6}$ |
| 80 | $3.6 \times 10^{-6}$ |

Although the conductivities listed in Table 2 for the composition of Example 4 are considerably smaller than conductivities of electrolytes used in electrochemical devices (ca. $10^{-3}$ S/cm), the conductivity is sufficient to achieve disbonding at room-temperature with an applied voltage greater than 10 V. The disbonding time can be a few seconds to several minutes depending on the load on the bond.

The foregoing embodiments represent disbondable compositions having matrix and electrolyte functionalities, which permit controlled disbonding from an electrically conductive substrate in response to an electrical voltage applied between the substrate and composition.

With reference to FIG. 1, a method of disbonding an adhesive composition includes passing an electrical current through the disbondable composition 8 in contact with electrically conducting substrates 10, 12 to disrupt the bonding at an adhesive/substrate interface 14 and thereby weaken the bond therebetween. Current is supplied to the composition using an electrical power source 18. When an electrical voltage is applied between the two substrates 10, 12, electrochemical reactions occur at the substrate/disbonding composition interfaces. The electrochemical reactions are understood as oxidative at the positively charged or anodic interface and reductive at the negatively charged or cathodic interface. The reactions are considered to weaken the adhesive bond between the substrates allowing the easy removal of the disbondable composition from the substrate. (For the purposes of discussion, in all figures one of the electronically conductive surfaces is designated as the positive electrode. It should be understood that the polarity of the system may be reversed.) The electrical power source must supply direct current. Direct current may be supplied from a battery or an AC-driven, DC power source.

Most disbanding processes require a voltage of only several volts, for example, less than 10 volts. However, higher voltages, e.g., on the order of up to 100 volts, may be useful to overcome the electrical resistance inherent in the system. Very little current, ca. $10^{-3}$ amps per square centimeter, is required to complete disbanding. Disbanding is accomplished rapidly, regardless of the complexity of the surface to be disbonded. In many cases, a potential need be applied for as little as two seconds to achieve release if assisted by a weight or spring. Even without external assistance, disbanding is typically complete within a minute, and in most applications disbonding time does not exceed the range of about 5 to 60 minutes.

The electrochemically disbondable composition may be selected so that disbonding occurs at either the positive or negative interface or simultaneously from both. The positive interface is the interface between the electrochemically disbondable composition and the electrically conductive surface that is in electrical contact with the positive electrode. Similarly, the negative interface is the interface between the electrochemically disbondable composition and the electrically conductive surface that is in electrical contact with the negative electrode. Disbonding occurs at a single interface for the disbonding compositions described in Examples 1-3 and 11-20 below. By reversing current direction prior to separation of the substrates, the bond may be weakened at both substrate interfaces. For some embodiments, however, a voltage applied across both surfaces so as to form an anodic interface and a cathodic interface will cause disbonding to occur simultaneously at both the anodic and cathodic adhesive/substrate interfaces 14, 16. In particular, disbanding occurs at both cathodic and anodic interfaces for the disbanding compositions described in Examples 4-10 below.

In an alternative embodiment, reversed polarity may be used to simultaneously disbond both substrate/adhesive interfaces if the composition does not respond at both interfaces to direct current. The current can be applied with any suitable waveform, provided sufficient total time at each polarity is allowed for disbonding to occur. Sinusoidal, rectangular, and triangular waveforms are appropriate. The waveform may be applied from a controlled voltage or a controlled current source.

Figure 2:
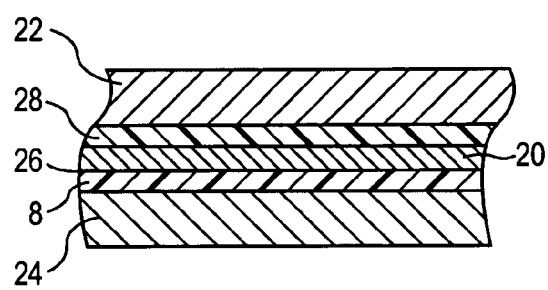
FIG. 2 is an enlarged sectional view of an embodiment of the invention incorporating a conductive foil into a bonded structure.

Non-conductive or non-conductively coated substrates may also be electrochemically disbonded by incorporation of an additional conducting element to complete the electrical circuit. With reference to FIG. 2, a conducting element 20 is incorporated into the bonding structure in those instances when one of the substrates 22, 24 is non-conductive or coated with a non-conductive layer. A voltage is applied between the conducting element 20 and an electrically conductive substrate (e.g., substrate 24) having a disbondable composition 8 disposed therebetween. Disbonding occurs at either conductive element/disbonding composition interface 26, at the surface of substrate 24, or at both interface 26 and substrate 24 depending on the arrangement of the electrical circuit and the choice of the composition. Conducting element 20 is bonded on its opposite face to the non-conducting substrate (in this case, substrate 22) by adhesive 28, which may be either a conventional adhesive or the electrochemically disbondable composition of the invention. It is contemplated that the use of a conducting element in joints and disbonding operations is not limited to non-conductive substrates and may also be used with conductive substrates.

The electrically conductive element may be any electrically conducting material capable of being embedded between two bonded surfaces. Exemplary elements include, but are not limited to, wire mesh, metal foil, conductive coatings, e.g., a silver-filled epoxy, or a deposited metal. In those instances where the conductive element is a wire mesh or grid, the mesh size should provide adequate surface area contact for the disbondable material, since bond weakening occurs in those areas in close proximity to the substrate.

Figure 3:
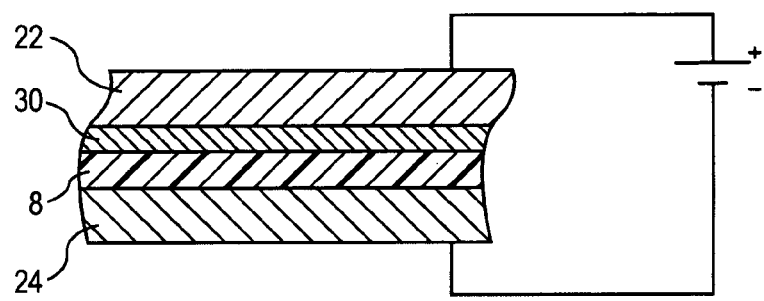
FIG. 3 is an enlarged sectional view of an embodiment of the invention incorporating a conductive coating into a bonded structure.

FIG. 3 illustrates an embodiment in which the conductive element is a conductive coating 30 coated or deposited (e.g., by sputtering) onto the surface of the non-conductive substrate 22.

Figure 4A:
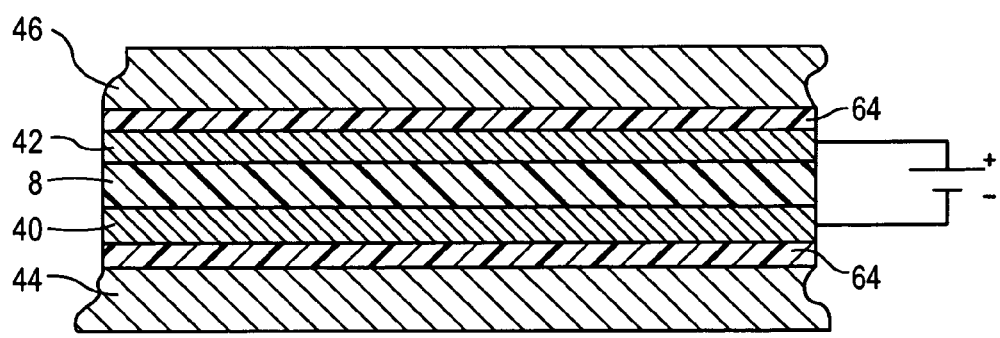
FIGS. 4A-C are enlarged sectional views of bonded articles of the invention incorporating electrically conductive sheets or coatings in the bonded structure.
Figure 4B:
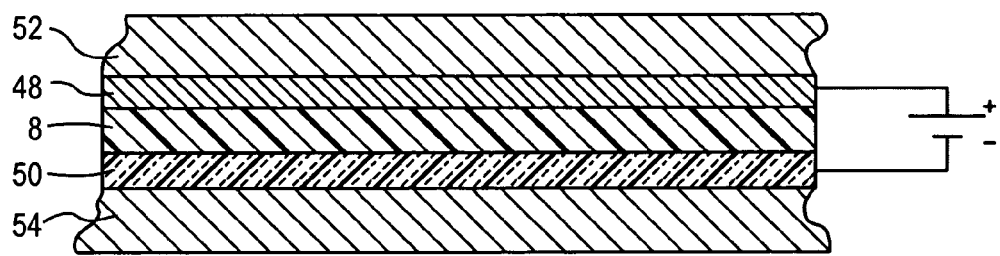
Figure 4C:
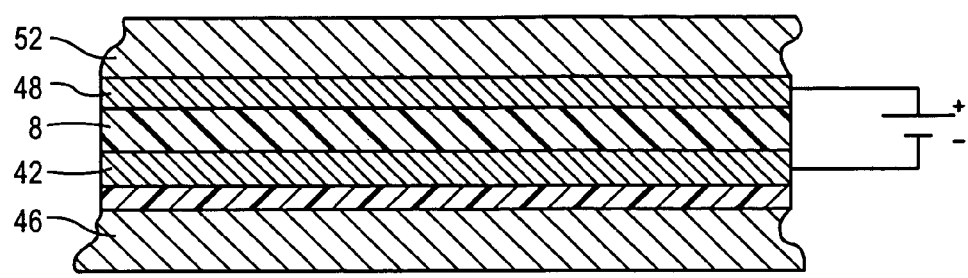

The method of the present invention can also electrically cleave a bond between two electrically non-conductive substrates. Disbonding is accomplished by using a bonded structure incorporating two electrically conductive elements. An electrical circuit is completed using the electrically conductive elements and disbonding occurs at the element. FIGS. 4A-4C illustrates several bonded structures of the invention.

FIG. 4A shows a bonded structure incorporating two electrically conductive foils, meshes or grids 40, 42. The electrochemically disbondable composition 8 is disposed therebetween. The elements 40, 42 are bonded to substrates 44, 46, respectively. Substrates 44, 46 may be conductive substrates, non-conductive substrates or substrates having a non-conductive coating, although the use of conductive elements is useful in those instances when both substrates are non-conductive. Conductive elements are bonded to the substrates using either conventional adhesives or the disbondable composition of the invention 64.

FIG. 4B shows a bonded structure incorporating two electrically conductive coatings 48, 50, which coat substrates 52, 54, and which are in electrical contact through external wires with a power source to complete the electrical circuit. The electrochemically disbondable composition 8 is disposed therebetween. Substrates 52, 54 may be conductive substrates, non-conductive substrates or substrates having a non-conductive coating, although the use of conductive elements is useful in those instances when both substrates are non-conductive.

FIG. 4C depicts a related bonded structure incorporating an electrically conductive foil, mesh or grid 42 and an electrically conductive coating 48 which coats substrate 52. The electrochemically disbondable composition 8 is disposed between the conductive elements 42, 48, which are in electrical contact through external wires with a power source to complete the electrical circuit. Substrates 46, 52 may be conductive or non-conductive, or substrates having a non-conductive coating. The use of conductive elements is advantageous in those instances when both substrates are non-conductive.

Figure 5:
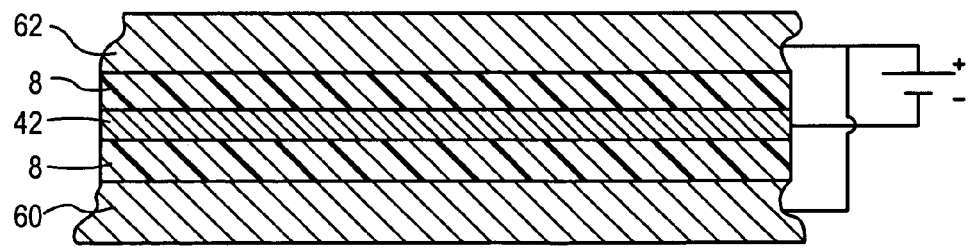
FIG. 5 is an enlarged sectional view of a bonded joint and electrical circuitry for simultaneous disbonding at more than one interface in a bonded joint.

Even if the composition is not formulated to disbond at both interfaces, this may still be accomplished (although not as cleanly) using an arrangement such as that shown in FIG. 5. The bonded structure includes a conductive element 42 disposed between two substrates 60, 62. Disbondable composition 8 is used in forming the bond. Substrates 60, 62 may be conductive substrates or they may incorporate conductive elements as described hereinabove to facilitate disbonding from non-conductive substrates. Both substrates are connected in parallel to the voltage source at the anode and the conductive elements serves as the cathode (in embodiments where anodic disbonding takes place). In operation, the anodic disbonding material/substrate interfaces are cleaved, leaving a conductive element 42 coated on both sides with disbonding material 8.

Figure 6:
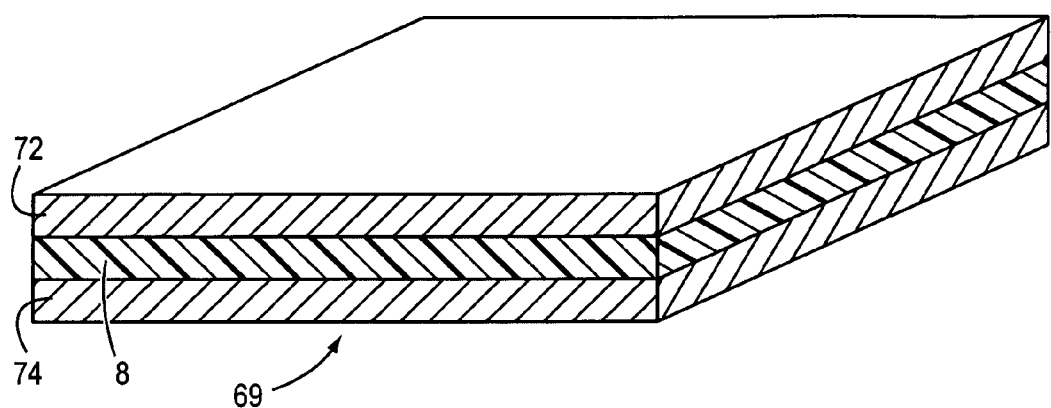
FIG. 6 is a perspective drawing of a laminate bonded structure.

A preferred embodiment of the invention includes a metal foil patch or laminate 69 such as that shown in FIG. 6. The patch includes a thin layer of electrochemically disbondable material 8, backed on either side by metal foils 72, 74 (typically aluminum foil). The patch is flexible and readily conforms to nonplanar surfaces. The patch can be cut to size, coated with adhesive and placed between the substrates to be bonded. Similar to the bonded structures described above, bonded structures formed using a foil patch may be readily separated at the metal foils by passing an electrical current between them.

In all of the above structures and articles, contact may be made with the conductive substrate or element through conventional means. Clips or other contacting means may be employed. In some embodiments, a conductive tab may be spot welded onto the electrically conductive substrate or element to improve electrical contact.

In another embodiment of the invention, the composition may be formulated with specific curing agents such that the cured material is removed from a substrate using solvents that are comparatively benign to the environment and pose minimal health risk to the practitioner. This embodiment is particularly useful following electrical disbonding of a composition. Residual material of the composition that remains on a substrate following the disbanding can be readily removed without resort to aggressive chemicals, heat or mechanical means. Thus, for example, an adhesive composition that disbonds at the anodic electrode can be removed from the cathodic electrode using a solvent such as a low molecular weight alcohol, e.g. methanol, ethanol, or the like. Removal of the composition is achieved by solvent swelling that is promoted by the rapid passage of the low molecular weight alcohol through the ionically conductive phase of the composition. The compositions described in Examples 4, 5, and 6 can be removed from most substrates after cure by water.

The disbanding process may also be used to remove material, which has been deposited on a substrate as a coating. For example, disbondable material is applied to a metal surface as a primer layer, over which a conductive film, such as silver-filled epoxy, and a suitable topcoat is applied. The coating is removed by attaching a power source to the metal surface (anode) and the silver-filled epoxy layer (cathode).

Alternatively, a conductive metal foil or plate may be contacted to the disbondable primer to serve as a cathode. The electrode serves as the cathode, for example, if the composition disbonds at the anodic interface. Contact is facilitated by placing an ionically conductive gel between the coating and the metal plate. Suitable gels comprise a polymer-thickened solution or liquid polymer electrolyte containing the same salt as is used in the disbonding adhesive, e.g., ammonium hexafluorophosphate.

Provided that the conductive path through an individual bond is electrically isolated from that of its neighboring bonds, specific bonds on a common substrate may be weakened without affecting adjacent areas, thereby allowing specific repair or replacement to be made. Very often, sporadic damage of coatings on large area surfaces only requires local removal and repair. Selected areas can be removed by simply contacting these areas with a counterelectrode. Surrounding areas will not be debonded.

Appliqués, or pre-formed, contact paper-like coatings are increasingly used to coat appliances, structures and vehicles. Use of a metallized or metal foil backed appliqué attached using the disbonding composition of the invention allows ready removal of the appliqué during refurbishment operations.

The invention is illustrated in the following examples which are not limiting of the invention, the full scope of which is shown in the claims which follow the specification.

(NON-HYBRID) ACRYLIC ADHESIVE EXAMPLES

Example 1

An electrically releasing thermosetting acrylic adhesive is formulated in 2 parts having a 10:1 mix ratio. Part A is formulated by mixing 12.13 parts of Zeon Hydrin C2000XL rubber [poly(epichlorohydrin-co-ethylene glycol)], 3.15 parts lithium perchlorate, 0.0335 parts 1-acetyl-2-phenyl hydrazine and 0.007 parts 4-methoxyphenol with 16 parts acetone. The mixture is sonicated for 2 hours and allowed to sit overnight to completely dissolve the rubber.

The solution is then concentrated by vacuum evaporation until the acetone content is reduced to ca. 2 parts. To this solution 30.42 parts of 2-methyl-2-nitropropyl methacrylate, 22.49 parts of tris[2-(acryloyloxy)ethyl]isocyanurate, 11.16 parts of isobornyl methacrylate, 4.53 parts of bis[2-(methacryloyloxy)ethyl]phosphate, 4.04 parts Sartomer CN 996 (proprietary urethane diacrylate) and 11.75 parts tetraethylene glycol dimethyl ether. Stir and let stand until rubber is completely dissolved. To this solution is then added 0.295 parts ferrocene. Part B is formulated by dissolving 39.54 parts Zeon Hydrin C200XL, 1 part benzoyl peroxide and 0.14 parts of saccharin in 59.32 parts of cumene hydroperoxide.

This composition is cured by blending part A with part B (10:1 by volume). The pot life of this mixture is ca. 3 minute. Specimens made by bonding 1-inch diameter cylinders together (face to face) were tested for tensile strength using an Instron pull tester (0.5 inch/min.) Tensile bond strength after 30 minutes is 50 psi. Strength after 1 hour is 540 psi and after 2 hours is 955 psi.

The ingredients of this composition are listed in Table 3. The weight fraction of monomers, which provide structural properties to the cured material is 66%. The content of ionically conductive materials comprising rubber, salt and plasticizing solvent is 28%.

TABLE 3

Typical Composition of Electrically Releasing Acrylic Adhesive

| Ingredient | Amount | % Loading |
|---|---|---|
| 2-Methyl-2-nitropropyl methacrylate | 30.42 | 27.65 |
| Tris[2-(acryloyloxy)ethyl]isocyanurate | 22.49 | 20.45 |
| Isobornyl methacrylate | 11.16 | 10.15 |
| Bis[2-(methacryloyloxy)ethyl]phosphate | 4.53 | 4.12 |
| Sartomer CN 996 | 4.04 | 3.67 |
| Stabilizers | 0.04 | 0.036 |
| Catalysts | 6.34 | 5.76 |
| Zeon Hydrin C200XL rubber | 16.08 | 14.62 |
| Lithium perchlorate | 3.15 | 2.86 |
| Tetraglyme | 11.75 | 10.68 |
| Total | 110 | |

The ultimate tensile bond strength of this composition is 1800-1900 psi on aluminum. This is reduced to less than 10% (125-175 psi) of the original bond strength by the application of 50-volts across the bond line for 1 minute.

Example 2

In this example the amount of ionically conductive materials (salt, rubber and solvent) is decreased to 19% by weight of the total composition. This composition is listed in Table 4.

TABLE 4

Electrically Releasing Acrylic Adhesive Composition with Low Loading of Ion Conductors

| Ingredient | Amount | % Loading |
|---|---|---|
| 2-Methyl-2-nitropropyl methacrylate | 30.42 | 31.17 |
| Tris[2-(acryloyloxy)ethyl]isocyanurate | 22.49 | 23.04 |
| Isobornyl methacrylate | 11.16 | 11.43 |
| Bis[2-(methacryloyloxy)ethyl]phosphate | 4.53 | 4.64 |
| Sartomer CN 996 | 4.04 | 4.14 |
| Stabilizers | 0.04 | 0.041 |
| Catalysts | 6.34 | 6.50 |
| Zeon Hydrin C200XL rubber | 9.64 | 9.88 |
| Lithium perchlorate | 1.89 | 1.94 |
| Tetraglyme | 7.05 | 7.22 |
| Total | 97.6 | |

The tensile strength of bonds formed with this composition is 2300 psi. This is reduced to 900 psi after application of a 50-volt d.c. potential across the bondline for 1 minute.

Example 3

In this example, the salt, rubber and solvent content of the example 1 composition is increased to 48%. The formula of this composition is listed in Table 5.

TABLE 5

Electrically Releasing Acrylic Adhesive Composition with High Loading of Ion Conductors

| Ingredient | Amount | % Loading |
|---|---|---|
| 2-Methyl-2-nitropropyl methacrylate | 30.42 | 20.00 |
| Tris[2-(acryloyloxy)ethyl]isocyanurate | 22.49 | 14.78 |
| Isobornyl methacrylate | 11.16 | 7.34 |
| Bis[2-(methacryloyloxy)ethyl]phosphate | 4.53 | 2.98 |
| Sartomer CN 996 | 4.04 | 2.66 |
| Stabilizers | 0.04 | 0.026 |
| Catalysts | 6.34 | 4.17 |
| Zeon Hydrin C200XL rubber | 37.95 | 24.95 |
| Lithium perchlorate | 7.43 | 4.88 |
| Tetraglyme | 27.73 | 18.23 |
| Total | 152.13 | |

Bonds formed with this composition exhibit a tensile bond strength of 830 psi. This is reduced to 100 psi after application of a 50-volt d.c. current across the bondline for 1 minute.

Epoxy/Acrylic Hybrid Adhesive Examples

Example 4

A two-part electrically releasing epoxy/acrylic hybrid adhesive formulation having a 4:1 (part A/part B) mix ratio is formulated as follows: Part A: Melt 16 parts of tris[2-(acryloyloxy)ethyl]isocyanurate (TAEI) in a 150° C. oven and blend with 2 parts of SP-25 phenolic resin. After a uniform mixture has been made it is blended with 20 parts of DGEBA. To this are added 33 parts of a mixture comprising 8.6 parts of sodium perchlorate dissolved in 30 parts of Dow 193 surfactant.

Part B: Melt 8 parts of tris[2-(acryloyloxy)ethyl]isocyanurate and add slowly to 24 parts of rapidly stirred tetraethylene pentamine. After addition and reaction are complete, 1 part each of Capcure 300 and Tetramethyl ethylenediamine (TMEDA) are added.

This composition has a pot life of 6 minutes and a fixture time of ca. 20 minutes. Cured at room-temperature it achieves a tensile bond strength of 255 psi after 1 hour, 830 psi after 2 hours and 1465 psi after 4 hours. It reaches an ultimate strength of 2290 psi.

Example 5

Listed in Table 6 is the formula for a toughened electronically releasing epoxy/acrylic hybrid composition. The mixing procedure is identical to that used in the previous example.

TABLE 6

Toughened Electrically Releasing Epoxy/Acrylic Hybrid Adhesive

| Ingredient | Part A Amount | Part B Amount | Total Amount | % |
|---|---|---|---|---|
| DGEBA | 2 | 0 | 2 | 20.41 |
| TAEI | 1.6 | 0.4 | 2 | 20.41 |
| Dow 193 surfactant | 2.56 | 0 | 2.56 | 26.12 |
| Sodium Perchlorate (NaClO$_4$) | 0.74 | 0 | 0.74 | 7.55 |
| SP-25 | 0.2 | 0 | 0.2 | 2.04 |
| Poly(ethylene glycol) diglycidyl ether (PEGGE) | 0.8 | 0 | 0.8 | 8.16 |
| Tetraethylene pentamine (TEPA) | 0 | 1.2 | 1.2 | 12.24 |

TABLE 6-continued

Toughened Electrically Releasing Epoxy/Acrylic Hybrid Adhesive

| Ingredient | Part A Amount | Part B Amount | Total Amount | % |
|---|---|---|---|---|
| Poly(propylene glycol), amine terminated (PPODA) | 0 | 0.2 | 0.2 | 2.04 |
| CapCure 300 | 0 | 0.05 | 0.05 | 0.51 |
| TMEDA | 0 | 0.05 | 0.05 | 0.51 |
| Total | 7.9 | 1.9 | 9.8 | |
| Ratio Part A/Part B | | | 4.16 | |

Upon mixing this composition has a pot life of 10 minutes and a fixturing time of about 30 minutes. It achieves an ultimate tensile strength of 1790 psi when cured at room-temperature. Treatment of 50-volts d.c. for one minute reduces the bond strength to 10 psi. Separation occurs at the anodic interface. The cathodic interface is also weakened, allowing easy removal of the residual adhesive.

Example 6

Listed in Table 7 is the formula for an electrically releasing epoxy/acrylic hybrid adhesive composition that simultaneously debonds at both the anodic and cathodic interfaces, leaving both substrates completely free of resin after debonding.

Again, this composition is blended in a manner identical to that listed in example 4. The composition yields a 4:1 2-part mixture having a pot life of about 10 minutes and a fixturing time of about 30 minutes.

TABLE 7

Epoxy Acrylic Hybrid Composition Having Extremely Low Residual Strength

| Ingredient | Part A Amount | Part B Amount | Total | % |
|---|---|---|---|---|
| DGEBA | 2 | 0 | 2 | 19.05 |
| TAEI | 1.6 | 0.5 | 2.1 | 20 |
| Dow 193 Surfactant | 2.56 | 0 | 2.56 | 24.38 |
| NaClO$_4$ | 0.74 | 0 | 0.74 | 7.05 |
| SP-25 | 0.2 | 0 | 0.2 | 1.90 |
| PEGGE | 1.3 | 0 | 1.3 | 12.38 |
| Triox | 0 | 1.2 | 1.2 | 11.43 |
| TEPA | 0 | 0.3 | 0.3 | 2.86 |
| CapCure 300 | 0 | 0.05 | 0.05 | 0.48 |
| TMEDA | 0 | 0.05 | 0.05 | 0.48 |
| Total | 8.4 | 2.1 | 10.5 | |
| Ratio | | | 4 | |

Cured at room-temperature, this composition achieves a tensile bond strength of 825 psi after 24 hours. The bond is rapidly released by the application of a 50-volt d.c. potential. There is no measurable residual bond strength.

Example 7

In this example, a high loading of ionically conductive comb polymer and electrolyte (>54% by weight) is incorporated into the standard electrically releasing epoxy/acrylic hybrid composition without significantly affecting the adhesive bond strength.

TABLE 8

Electrically Releasing Epoxy/Acrylic Hybrid Adhesive with High Loading of Ion Conductors

| Ingredient | Part A Amount | Part B Amount | Total | % |
|---|---|---|---|---|
| Dow 193 Surfactant | 5.12 | 0 | 5.12 | 42.31 |
| NaClO$_4$ | 1.48 | 0 | 1.48 | 12.23 |
| DGEBA | 2 | 0 | 2 | 16.53 |
| TAEI | 1.6 | 0.4 | 2 | 16.53 |
| SP-25 | 0.2 | 0 | 0.2 | 1.65 |
| TEPA | 0 | 1.2 | 1.2 | 9.92 |
| CapCure 300 | 0 | 0.05 | 0.05 | 0.41 |
| TMEDA | 0 | 0.05 | 0.05 | 0.41 |
| Total | 10.4 | 1.7 | 12.1 | |
| Ratio | | | 6.12 | |

The composition yields bonds exhibiting a tensile strength of ca. 1700 psi. This strength is reduced to 10 psi by application of a 50-volt current across the bondline for 1 minute.

Example 8

In this example, the loading of ionically conductive comb polymer and electrolyte is reduced to under 30% by weight. This does not affect the debonding performance, however the strength of the resulting adhesive is not improved.

TABLE 9

Electrically Releasing Epoxy/Acrylic Hybrid Adhesive with Low Loading of Ion Conductors

| Ingredient | Part A Amount | Part B Amount | Total | % |
|---|---|---|---|---|
| Dow 193 Surfactant | 1.79 | 0 | 1.79 | 22.95 |
| NaClO$_4$ | 0.51 | 0 | 0.51 | 6.54 |
| DGEBA | 2 | 0 | 2 | 25.64 |
| TAEI | 1.6 | 0.4 | 2 | 25.64 |
| SP-25 | 0.2 | 0 | 0.2 | 2.56 |
| TEPA | 0 | 1.2 | 1.2 | 15.38 |
| CapCure 300 | 0 | 0.05 | 0.05 | 0.64 |
| TMEDA | 0 | 0.05 | 0.05 | 0.64 |
| Total | 6.1 | 1.7 | 7.8 | |
| Ratio | | | 3.59 | |

Adhesive bonds formed with this composition exhibit a tensile strength of ca. 1500 psi, which is reduced to 10 psi by application of a 50-volt current across the bondline for 1 minute.

Example 9

In this example, a plasticizing solvent has been added to the standard electrically releasing epoxy/acrylic hybrid adhesive to increase conductivity. This additive does not greatly affect the bond strength of the composition and has no effect on the debond performance.

TABLE 10

Electrically Releasing Epoxy/Acrylic Hybrid Adhesive with Added Plasticizer

| Ingredient | Part A Amount | Part B Amount | Total | % |
|---|---|---|---|---|
| DGEBA | 2.5 | 0.2 | 2.7 | 28.18 |
| TAEI | 1.5 | 0.12 | 1.62 | 16.91 |
| NaP-193 | 3.3 | 0.26 | 3.56 | 37.16 |
| SP-25 | 0.15 | 0.01 | 0.16 | 1.67 |
| Trimethylolpropane triacrylate | 0.1 | 0.01 | 0.11 | 1.15 |
| tetraglyme | 0.15 | 0.01 | 0.16 | 1.67 |
| Triox | 0 | 0.8 | 0.8 | 8.35 |
| TEPA 24 | 0 | 0.4 | 0.4 | 4.18 |
| CapCure | 0 | 0.05 | 0.05 | 0.52 |
| TMEDA | 0 | 0.02 | 0.02 | 0.21 |
| Total | 7.7 | 1.88 | 9.58 | |
| Ratio | | | 4.1 | |

Example 10

Incorporation of highly polar tris(epoxypropyl) isocyanurate in place of the DGEBA renders this mixture extremely reactive. It has a pot life of 2 minutes and reaches fixturing strength in 6 minutes. This composition achieves full cure in 12 hours at room-temperature. It can also be cured at elevated temperatures at much faster rates. Several seconds of exposure to 150° C. are all that is required to form a high strength, electrically releasing bond with this composition.

TABLE 11

Tris(epoxypropyl) Isocyanurate Based Epoxy/Acrylic Hybrid Adhesive Composition

| Ingredient | Amnt (%) |
|---|---|
| Part A | |
| Dow 193 Surfactant (comb polymer) | 29.50 |
| Ammonium Hexafluorophosphate | 9.83 |
| Tris(epoxypropyl) isocyanurate (TEPI) | 17.88 |
| Tris[2-(acryloyloxy) ethyl] isocyanurate (TAEI) | 17.88 |
| SP-25 Phenolic resin | 1.78 |
| Tributyl phosphate (TBP) | 1.88 |
| Tetraethylene glycol dimethyl ether (tetraglyme) | 1.25 |
| Total | 80 |
| Part B | |
| 4,7,10-trioxa-1,13-tridecanediamine (triox) | 8.5 |
| Tetraethylene pentamine (TEPA) | 3.32 |
| Isophorone Diamine (IPDA) | 0.71 |
| Poly(propylene glycol) diamine (PPODA) Mn = 2000 | 0.36 |
| TMEDA | 0.07 |
| TSP-720 thickener | 0.64 |
| Copper phthalocyanine in 193 | 0.36 |
| Titanium dioxide | 0.36 |
| Part A added to stage this composition | 5.69 |
| Total | 20 |

Part A is formulated by mixing 20 grams of TEPI with 20 grams of TAEI, 2 grams of phenolic resin (SP-25), 2.1 grams of TBP and 1.4 grams of tetraglyme. The mixture is heated in a 150° C. oven for 20 minute with stirring until the mixture is a homogenous liquid. The mixture is cooled to room-temperature and blended with 44 grams of E-193 (11 grams NH$_4$PF$_6$ dissolved in 33 grams of Dow 193 surfactant). The mixture is heated to 150° C. and vacuum degassed. Eq. Wt: 265

Part B is formulated by blending 11.95 grams of 4,7,10-trioxa-1,13-tridecanediamine with 4.67 grams of TEPA, 1 gram of IPDA, 0.5 grams of PPODA 2000 and 0.1 grams of TMEDA. To this mixture are added 0.9 grams of TSP-720 (hydrophobic fumed silica thickener), 0.5 grams of 193 blue (1% copper phthalocyanine in E-193) and 0.5 grams of titanium dioxide powder. This mixture is then blended with 8 grams of part A. Total weight: 27.67. (217 Meq triox+195 Meq TEPA+24 Meq IPDA+5 Meq PPODA=441 Meq) (total equivalents 441−30=411) Eq. Wt.=67.

This composition is cured by blending a 4:1 ratio by weight of part A with part B. Initial cure is rapid. However, as shown in Table 11, ca. 3-4 hours are required before the adhesive achieves sufficient strength to be used for machining operations. At that time the adhesive provides an extremely rigid bond, which is desirable for accurate machining operations.

TABLE 12

Strength versus time for Tris(epoxypropyl) isocyanurate Based Composition

| Time | Lapshear Strength (psi) |
|---|---|
| 10 minutes | 50 |
| 1 hr | 100 |
| 2 hrs | 325 |
| 3 hrs | 550 |
| 4 hrs | 775 |
| 6 hrs | 950 |
| 24 hrs | 1500 |

Example 11

An electrically releasing epoxy/acrylic hybrid exhibiting a very high degree of mechanical toughness is formulated by substituting a flexible diacrylate (Hexanediol propoxylate diacrylate) for a portion of the more rigid tris[2-(acryloyloxy)ethyl]isocyanurate. The formula for this composition is listed in Table 13.

TABLE 13

Electrically Releasing Epoxy/Acrylic Hybrid Adhesive Composition Exhibiting High Toughness

| Ingredient | Part A Amount | Part B Amount | Total | % |
|---|---|---|---|---|
| DGEBA | 2 | 0 | 2 | 22.73 |
| TAEI | 1.55 | 0.05 | 1.6 | 18.18 |
| Hexanediol propoxylate diacrylate | 0 | 0.5 | 0.5 | 5.68 |
| Dow 193 Surfactant | 2.56 | 0 | 2.56 | 29.09 |
| NaClO$_4$ | 0.74 | 0 | 0.74 | 8.41 |
| SPE-25 | 0.2 | 0 | 0.2 | 2.27 |
| TEPA | 0 | 1.2 | 1.2 | 13.64 |
| Total | 7.05 | 1.75 | 8.8 | |
| Ratio Part A/Part B | | | 4.03 | |

Additional Acrylic Examples

The following are examples of electrically debonding acrylic adhesive compositions. All exhibit moderate to high bond strengths to aluminum substrates and all can be substantially weakened by the application of a 50-volt d.c. current.

Example 12

TABLE 14

Electrically Debonding Acrylic Adhesive Composition

| Ingredient | Amount | % |
|---|---|---|
| Epi-co-EO-co-AGE rubber | 4 | 30.53 |
| 2-methyl-2-nitropropyl methacrylate | 4 | 30.53 |
| Bis[2-(methacryloyloxy)ethyl]phosphate | 0.3 | 2.29 |
| Ammonium Hexafluorophosphate | 1.2 | 9.16 |
| Poly(indene-co-coumarone) | 0.2 | 1.53 |
| Isobornyl methacrylate | 2.1 | 16.03 |
| Tetraethylene glycol dimethylether | 1.1 | 8.40 |
| AIBN | 0.2 | 1.53 |
| Total | 13.1 | |
| Bond strength | 900 psi | |
| Conductivity | 20 milliamps/si | |

Example 13

TABLE 15

Electrically Debonding Acrylic Adhesive Composition

| Ingredient | Amount | % |
|---|---|---|
| Epi-co-EO-co-AGE rubber | 4 | 30.53 |
| 2-methyl-2-nitropropyl methacrylate | 4 | 30.53 |
| Bis[2-(methacryloyloxy)ethyl]phosphate | 0.3 | 2.29 |
| Ammonium Hexafluorophosphate | 1.2 | 9.16 |
| poly(indene-co-coumarone) | 0.2 | 1.53 |
| Isobornyl methacrylate | 2.1 | 16.03 |
| Poly(ethylene glycol) Mn 600 | 1.1 | 8.40 |
| AIBN | 0.2 | 1.53 |
| Total | 13.1 | |

Example 14

TABLE 16

Electrically Debonding Acrylic Adhesive Composition

| Ingredient | Amount | % |
|---|---|---|
| Epi-co-EO-co-AGE rubber | 4 | 28.17 |
| 2-methyl-2-nitropropyl methacrylate | 4 | 28.17 |
| Bis[2-(methacryloyloxy)ethyl]phosphate | 0.3 | 2.11 |
| Ammonium Hexafluorophosphate | 1.2 | 8.45 |
| poly(indene-co-coumarone) | 0.2 | 1.41 |
| Isobornyl methacrylate | 1 | 7.04 |
| tetraethylene glycol dimethylether | 1.1 | 7.75 |
| Bisphenol A glycerolate diacrylate | 2.2 | 15.49 |
| AIBN | 0.2 | 1.41 |
| Total | 14.2 | |
| Conductivity | 20. milliamps/si | |

Example 15

TABLE 17

Electrically Debonding Acrylic Adhesive Composition

| Ingredient | Amount | % |
|---|---|---|
| Epi-co-EO-co-AGE rubber | 4 | 30.53 |
| 2-methyl-2-nitropropyl methacrylate | 4 | 30.53 |
| Bis[2-(methacryloyloxy)ethyl]phosphate | 0.3 | 2.29 |
| Ammonium Hexafluorophosphate | 1.2 | 9.16 |
| poly(indene-co-coumarone) | 0.2 | 1.53 |
| Isobornyl methacrylate | 1 | 7.63 |
| tetraethylene glycol dimethylether | 1.1 | 8.40 |
| Tris[2-(acryloxyoyl)ethyl]isocyanurate | 1.1 | 8.40 |
| AIBN | 0.2 | 1.53 |
| Total | 13.1 | |
| Conductivity | 7 milliamps/si | |

Example 16

TABLE 18

Electrically Debonding Acrylic Adhesive Composition

| Ingredient | Amount | % |
|---|---|---|
| Poly(acrylonitrile-co-butadiene) | 4 | 32.52 |
| 2-methyl-2-nitropropyl methacrylate | 4 | 32.52 |
| Bis[2-(methacryloyloxy)ethyl]phosphate | 0.3 | 2.44 |
| Ammonium Hexafluorophosphate | 1.2 | 9.76 |
| poly(indene-co-coumarone) | 0.2 | 1.63 |
| Isobornyl methacrylate | 1 | 8.13 |
| tetraethylene glycol dimethylether | 1.1 | 8.94 |
| Bisphenol A glycerolate diacrylate | 0.3 | 2.44 |
| AIBN | 0.2 | 1.63 |
| Total | 12.3 | |
| Conductivity | 30 milliamps/si | |

Example 17

TABLE 19

Electrically Debonding Acrylic Adhesive Composition

| Ingredient | Amount | % |
|---|---|---|
| Epi-co-EO-co-AGE rubber | 4 | 32.0 |
| Tetrahydrofurfuryl acrylate | 4 | 32.0 |
| Bis[2-(methacryloyloxy)ethyl]phosphate | 0.3 | 2.4 |
| Ammonium Hexafluorophosphate | 1.2 | 9.6 |
| poly(indene-co-coumarone) | 0.2 | 1.6 |
| Isobornyl methacrylate | 1 | 8.0 |
| tetraethylene glycol dimethylether | 1.1 | 8.8 |
| Bisphenol A glycerolate diacrylate | 0.5 | 4.0 |
| AIBN | 0.2 | 1.6 |
| Total | 12.5 | |
| Conductivity | 20 milliamps/si | |

Example 18

TABLE 20

Electrically Debonding Acrylic Adhesive Composition

| Ingredient | Amount | % |
|---|---|---|
| Poly(acrylonitrile-co-butadiene) | 2.02 | 17.97 |
| 2-methyl-2-nitropropyl methacrylate | 4 | 35.59 |
| Bis[2-(methacryloyloxy)ethyl]phosphate | 0.2 | 1.78 |
| Ammonium Hexafluorophosphate | 0.6 | 5.334 |
| poly(indene-co-coumarone) | 0.2 | 1.78 |
| Isobornyl methacrylate | 2.02 | 17.97 |
| tetraethylene glycol dimethylether | 1.1 | 9.79 |
| Tris[2-(acryloxyoyl)ethyl]isocyanurate | 1 | 8.90 |
| AIBN | 0.1 | 0.89 |
| Total | 11.24 | |
| Conductivity | 50 milliamps/si | |

Example 19

TABLE 21

Electrically Debonding Acrylic Adhesive Composition

| Ingredient | Amount | % |
|---|---|---|
| Epi-co-EO-co-AGE rubber | 2 | 12.90323 |
| Bis[2-(methacryloyloxy)ethyl]phosphate | 0.5 | 3.225806 |
| Ammonium Hexafluorophosphate | 1.2 | 7.741935 |
| Isobornyl methacrylate | 5.1 | 32.90323 |
| tetraethylene glycol dimethylether | 1.6 | 10.32258 |
| Trimethylopropane ethoxylate triacrylate | 1 | 6.451613 |
| Tris[2-(acryloxyoyl)ethyl]isocyanurate | 3 | 19.35484 |
| Tributyl phosphate | 0.8 | 5.16129 |
| AIBN | 0.3 | 1.935484 |
| Total | 15.5 | |
| Conductivity | 20 milliamps/si | |

What is claimed is:

1. An electrochemically disbondable composition, comprising:
   a matrix functionality comprising a monomer selected from the group consisting of acrylics, methacrylics, and combinations thereof; and
   an electrolyte, wherein the electrolyte provides sufficient ionic conductivity to said composition to support a faradaic reaction at a bond formed between the composition and an electrically conductive surface and allow the composition to disbond from the surface; and
   a free radical initiator.

2. The composition of claim 1, wherein the monomer comprises at least one member of the group consisting of polar and non-polar monomers.

3. The composition of claim 1, wherein the monomer comprises at least one member of the group consisting of: 2-methyl-2-nitropropyl methacrylate, tetrahydrofurfuryl acrylate, 2-ethylhexyl methacrylate, isobornyl methacrylate, bisphenol A glycerolate diacrylate, trimethylol propane triacrylate, tris[2-(acryloyloxy)ethyl]isocyanurate, poly(ethylene glycol) monoacrylate, poly(ethylene glycol) diacrylate, poly(ethylene glycol) methacrylate, poly(propylene glycol) monoacrylate, poly(propylene glycol) diacrylate, poly(propylene glycol) methacrylate, and bis[2-(methacryloyloxy)ethyl]phosphate.

4. The composition of claim 1, wherein the electrolyte comprises a rubber toughener.

5. The compositions of claim 4, wherein the rubber toughener comprises at least one member of the group consisting of: poly(butadiene-co-acrylonitrile), poly(epichlorohydrin), poly(epichlorohydrin-co-ethylene oxide, poly(epichlorohydrin-co-ethylene oxide-co-allyl glycidyl ether), and uncrosslinked rubbers containing ester, carbonate, amide, urethane, urea or vinylidene fluoride functionalities.

6. The composition of claim 1, further comprising an additive selected from the group consisting of stability enhancers, cure enhancers, cure accelerants, plasticizers, ion coordinators, pigments, corrosion inhibitors, leveling agents, gloss promoters, and fillers.

7. The composition of claim 6, wherein the plasticizer comprises at least one member of the group consisting of tetraethyleneglycol dimethyl ether (tetraglyme), low molecular weight oligomers of polyethylene glycol, and tributyl phosphate.

8. The composition of claim 1, wherein the free radical initiator comprises at least one member of the group consisting of redox activated initiators, thermally activated initiators, ultraviolet activated initiators, and visible light activated initiators.

9. The composition of claim 8, wherein the thermally activated initiator comprises azobis(isobutyl nitrile).

10. The composition of claim 8, wherein the redox activated initiator comprises a peroxide and a reducing agent.

11. The composition of claim 10, wherein the peroxide comprises benzoyl peroxide.

12. The composition of claim 10, wherein the reducing agent comprises an amine or a transition metal salt.

13. The composition of claim 10, wherein the reducing agent comprises ferrocene.

14. The composition of claim 1, wherein the electrolyte includes a salt capable of being solvated into the composition.

15. The composition of claim 14, wherein the salt comprises at least one member of the group consisting of the ammonium, alkali metal, alkali earth or rare earth salts of perchlorate, tetrafluoroborate, hexafluorophosphate, triflate and triflimide anions.

16. The composition of claim 14, wherein the salt comprises at least one member of the group consisting of lithium triflimide, lithium perchlorate, ammonium hexafluorophosphate, and sodium perchlorate.

17. The composition of claim 1, wherein the composition is an adhesive.

18. The composition of claim 1, wherein the composition is a coating.

19. The composition of claim 1, wherein the composition is a sealant.

20. The composition of claim 1, wherein the composition forms a bond having a shear strength of at least 200 psi.

21. The composition of claim 1, wherein the composition has an ionic conductivity in the range of $10^{-11}$ to $10^{-5}$ S/cm$^2$.

22. The composition of claim 1, wherein the composition forms a bond having a fixture time of less than about 20 minutes.

23. The electrochemically disbondable composition of claim 1, wherein the matrix functionality further comprises an epoxy.

24. The composition of claim 23, wherein the epoxy comprises at least one member of the group consisting of Bisphenol A type epoxies, novolac epoxies and tris epoxypropyl isocyanurate.

25. The composition of claim 23, further comprising an additive selected from the group consisting of stability enhancers, curing agents, cure accelerants, plasticizers, pigments, corrosion inhibitors, leveling agents, gloss promoters, and filler.

26. The composition of 25, wherein the cure accelerant comprises mercaptan or tetramethyl ethylenediamine.

27. The composition of 25, wherein the curing agent comprises at least one member of the group consisting of linear aliphatic amines, cycloaliphatic amines, or combinations thereof.

28. The composition of claim 27, wherein the linear aliphatic amine comprises at least one member of the group consisting of tetraethylene pentamine, triethylene tetramine, diethylene triamine, 4,7,10-trioxa-1,13-tridecanediamine, and jeffamines.

29. The composition of claim 27, wherein the cycloaliphatic amine comprises isophorone diamine.

30. The composition of claim 27, wherein the stoichiometric ratio of linear aliphatic amine or cycloaliphatic amine to epoxy is about 1:1.

31. The composition of claim 25, wherein the stability enhancer comprises SP-25 phenolic resin.

32. The composition of 23, wherein the electrolyte includes a salt capable of being solvated into the composition.

33. The composition of claim 32, wherein the salt comprises sodium perchlorate.

34. The composition of claim 23, wherein the electrolyte includes an ion conductor.

35. The composition of claim 34, wherein the ion conductor is a block copolymer or a graft copolymer.

36. The composition of claim 35, wherein the graft polymer comprises a siloxane backbone and pendant blocks of high ionic conductivity.

37. The composition of claim 35, wherein the graft copolymer comprises dimethicone polyols.

38. The composition of claim 36, wherein the pendant blocks comprise polyether or polyglycol moieties.

39. The composition of claim 35, wherein the graft copolymer is selected from the group consisting of: dimethyl-methyl (polyethylene oxide) siloxanes, alkoxylated 3-hydroxypropyl-terminated dimethyl siloxanes, and dimethyl-methyl(3-hydroxypropyl) siloxanes.

40. The composition of claim 35, wherein the block copolymer comprises a linear block copolymer having matrix miscible and matrix immiscible blocks.

41. The composition of claim 40, wherein the linear block copolymer comprises polyethylene-block-poly(ethylene glycol).

42. The composition of claim 40, wherein the linear block copolymer comprises poly(ethylene glycol)-block-poly(propylenene glycol)-block-poly(ethylene glycol).

43. The composition of claim 40, wherein the matrix miscible blocks are selected from the group consisting of aliphatic and aromatic polyethers, nitrile-functionalized polymers, acrylic and vinyl polymers and polyamides.

44. The composition of claim 40, wherein the matrix immiscible blocks are selected from the group consisting of aliphatic and aromatic hydrocarbon polymers, acrylic and vinyl polymers, silicone polymers, phosphazine polymers, fluoropolymers, polysulfides, polyesters, polyamides and rigid-rod polymers.

45. The composition of claim 23, wherein the composition is an adhesive.

46. The composition of claim 23, wherein the composition is a coating.

47. The composition of claim 23, wherein the composition is a sealant.

48. The composition of claim 23, wherein the composition forms a bond having a shear strength of at least 200 psi.

49. The composition of claim 23, wherein the composition has an ionic conductivity in the range of $10^{-11}$ to $10^{-5}$ S/cm$^2$.

50. The composition of claim 23, wherein the composition forms a bond having a fixture time of less than about 20 minutes.

51. The composition of claim 23, wherein the composition forms a bond that cures at less than about 80° C. in 30 minutes or less.

* * * * *